(12) United States Patent
Gray et al.

(10) Patent No.: US 11,374,975 B2
(45) Date of Patent: Jun. 28, 2022

(54) TLS INTEGRATION OF POST QUANTUM CRYPTOGRAPHIC ALGORITHMS

(71) Applicant: International Business Machines Corporation, Armonk, NY (US)

(72) Inventors: Michael W. Gray, Guanaba (AU); Narayana Aditya Madineni, Southport (AU); Simon D. McMahon, Gold Coast (AU); Matthew Green, Ashmore (AU); Leigh S. McLean, Nerang (AU); Peter T. Waltenberg, Gold Coast (AU)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 16/919,254

(22) Filed: Jul. 2, 2020

(65) Prior Publication Data

US 2022/0006835 A1    Jan. 6, 2022

(51) Int. Cl.
  *H04L 29/06* (2006.01)
  *H04L 9/08* (2006.01)
  *H04L 9/40* (2022.01)

(52) U.S. Cl.
  CPC ............ *H04L 63/166* (2013.01); *H04L 9/085* (2013.01); *H04L 9/0825* (2013.01); *H04L 9/0861* (2013.01); *H04L 63/0442* (2013.01)

(58) Field of Classification Search
  CPC ..... H04L 63/166; H04L 9/0825; H04L 9/085; H04L 9/0861; H04L 63/0442
  See application file for complete search history.

(56) References Cited

U.S. PATENT DOCUMENTS 10,218,504 B1 * 2/2019 Kalach ................. H04L 9/0819
10,951,652 B1 * 3/2021 Sharifi Mehr ...... H04L 63/0807
(Continued)

FOREIGN PATENT DOCUMENTS

| EP | 3171565 A1 * | 5/2017 | ......... H04L 41/0836 |
| EP | 3432509 A1 | 1/2019 | |
| EP | 3562115 A1 | 10/2019 | |

OTHER PUBLICATIONS

D. Benjamain, Applying Generate Random Exentsions and Sustain Extensibility (GREASE) to TLS Extensibility, Jan. 2020 (Year: 2020).*

(Continued)

*Primary Examiner* — Darshan I Dhruv
(74) *Attorney, Agent, or Firm* — Jorge R. Maranto

(57) ABSTRACT

A method and a system for integrating post quantum cryptographic algorithms into TLS. The method includes transmitting a client hello message to a server including a request for post quantum cryptographic (PQC) mode of operation and a PQC public client key, receiving a server hello message from the server in response to the client hello message including a PQC server key exchange generated from the PQC public client key. The method includes determining the server hello message includes an authorization to operate the PQC mode of operation. The method also includes transmitting a second client hello message to the server including a PQC encrypted client key share. The PQC encrypted client key share is encrypted using a client encryption key. The method includes receiving a second server hello message that includes a PQC encrypted server key share and decrypting the PQC encrypted server key share using a server encryption key.

20 Claims, 13 Drawing Sheets

(56) References Cited

U.S. PATENT DOCUMENTS

| | | | |
|---|---|---|---|
| 2008/0285756 A1* | 11/2008 | Chuprov | H04L 63/062 380/277 |
| 2012/0284506 A1* | 11/2012 | Kravitz | G06Q 40/00 713/150 |
| 2016/0277372 A1* | 9/2016 | Shah | H04L 63/0485 |
| 2018/0026950 A1* | 1/2018 | Wasiq | H04L 63/0478 713/152 |
| 2018/0103013 A1* | 4/2018 | Imai | H04L 63/061 |
| 2018/0109372 A1* | 4/2018 | Fu | H04L 9/0897 |
| 2019/0356694 A1* | 11/2019 | Wang | H04L 63/0281 |
| 2020/0220719 A1* | 7/2020 | Chaudhari | H04L 9/0841 |
| 2020/0403978 A1* | 12/2020 | Allen | H04L 63/205 |
| 2021/0119800 A1* | 4/2021 | Jung | H04L 63/166 |

OTHER PUBLICATIONS

Sikeridis et al., "Post-Quantum Authentication in TLS 1.3: A Performance Study," Network and Distributed Systems Security (NDSS) Symposium, Feb. 2020, pp. 1-16.

Benjamin, D., "Applying Generate Random Extensions and Sustain Extensibility (GREASE) to TLS Extensibility," Internet Engineering Task Force (IETF), Request for Comments: 8701, Jan. 2020, 10 pages.

"Post-Quantum TLS," Microsoft Research, Printed: Mar. 7, 2020, 3 pages. https://www.microsoft.com/en-us/research/project/post-quantum-tls/.

"Post-Quantum Cryptography," NIST Computer Security Resource Center, Jan. 7, 2020 (last updated Mar. 25, 2020), pp. 1-2. https://csrc.nist.gov/Projects/post-quantum-cryptography.

Valence H., "SIDH in Go for quantum-resistant TLS 1.3," The Cloudflare Blog, Sep. 1, 2017, pp. 1-5. https://blog.cloudflare.com/sidh-go/.

Kwiatkowski, K., "Towards Post-Quantum Cryptography in TLS," The Cloudflare Blog, Jun. 20, 2019, pp. 1-14. https://blog.cloudflare.com/towards-post-quantum-cryptography-in-tls/.

"Open-quantum-safe / openssl," GitHub, Printed: Jun. 1, 2020, pp. 1-10. https://github.com/open-quantum-safe/openssl.

Hopkins, A., "Post-quantum TLS now supported in AWS KMS," AWS Security Blog, Nov. 4, 2019, pp. 1-10. https://aws.amazon.com/blogs/security/post-quantum-tls-now-supported-in-aws-kms/.

Crockett et al., Prototyping post-quantum and hybrid key exchange and authentication in TLS and SSH, NISTPQC-CroPaqSte19, Jul. 19, 2019, pp. 1-24.

Bos et al., "Crystals—Kyber: a CCA-secure module-lattice-based KEM," Cryptology ePrint Archive, 2017, 16 pgs. https://eprint.iacr.org/2017/634.pdf.

Mell et al., "The NIST Definition of Cloud Computing", Recommendations of the National Institute of Standards and Technology, Special Publication 800-145, Sep. 2011, 7 pages.

Bos, Joppe & Costello, Craig & Naehrig, Michael & Stebila, Douglas. (2015). Post-Quantum Key Exchange for the TLS Protocol from the Ring Learning with Errors Problem. 2015. 10.1109/SP.2015.40.

Crockett, E. and Matthew J. Campagna. "BIKE and SIKE Hybrid Key Exchange Cipher Suites for Transport Layer Security (TLS)." (2019). https://api.semanticscholar.org/CorpusID:132975444.

PCT/EP2021/067967, International Search Report and Written Opinion, dated Oct. 4, 2021.

\* cited by examiner

TLS INTEGRATION OF POST QUANTUM CRYPTOGRAPHIC ALGORITHMS

BACKGROUND

The present disclosure relates to post-quantum cryptography, and more specifically, to implementing post-quantum cryptographic algorithms in Transport Layer Security (TLS) protocols.

Quantum computing is a model of computing that implements quantum physics to compute differently than a classical computer. Unlike a classical computer, which operates on bits that are 0 or 1, quantum computers are based on quantum bits (or qubits), which can be both 0 and 1 simultaneously. This state of ambiguity is known as superposition. Quantum computing has the potential to perform quantum speed-up and exponential speed-ups. Quantum speed-up occurs when a problem can be solved faster by a quantum computer than by a classical one. Exponential speed-ups occur when a task that takes an exponential amount of time on a classical computer can be performed on a quantum computer with polynomial complexity.

The TLS protocol is a protocol used to establish secure connections between servers and clients. Various public-key cryptographic algorithms are used by TLS to encrypt transmissions between a server and a client. These cryptographic algorithms include, for example, Rivest-Shamir-Adleman (RSA), Diffie-Hellman, and elliptic curve cryptography. Quantum computers have the potential to break these cryptosystems and allow an attacker to decrypt encrypted transmissions between a server and a client.

SUMMARY

Embodiments of the present disclosure include a computer-implemented method for integrating post-quantum cryptographic algorithms into TLS. The computer-implemented method includes transmitting a client hello message to a server. The client hello message includes a random value that signals a request for post-quantum cryptographic (PQC) mode of operation to establish a secure connection between a client and the server. Additionally, the client hello message includes a PQC public client key as another parameter. The computer-implemented method includes receiving a server hello message from the server in response to the client hello message. The server hello message includes a PQC server key exchange generated from the PQC public client key. The computer-implemented method further includes determining the server hello message which includes an authorization to operate the PQC mode of operation. The authorization can be in the form of another random value containing a signal authorizing the mode. The computer-implemented method also includes transmitting a second client hello message to the server. The second client hello message includes a PQC encrypted client key share. The PQC encrypted client key share is encrypted using a client encryption key derived from a PQC shared key and a transcript hash. The computer-implemented method includes receiving a second server hello message that includes a PQC encrypted server key share and decrypting the PQC encrypted server key share using a server encryption key derived from the PQC shared key and the transcript. The computer-implemented method includes establishing a secure connection between the client and the server using the decrypted server key share.

Additional embodiments of the present disclosure include a computer-implemented method for integrating post-quantum cryptographic algorithms into TLS. The computer-implemented method includes receiving a client hello message from a client requesting an establishment of a secure connection with a server. The client hello message includes a PQC public client key and a random value. The computer-implemented method also includes determining that the client hello message contains a PQC mode of operation request embedded in the random value. The computer-implemented method further includes transmitting a server hello message to the client. The server hello message includes a retry request, a server random value with an embedded signal recognizing the PQC mode of operation, and a server key exchange as parameters. The server key exchange being generated from the PQC public client key received in the client hello message. The computer-implemented method also includes receiving a second client hello message from the client. The second client hello message includes a PQC encrypted client key share. The computer-implemented method also includes encrypting a PQC server key share using a server encryption key derived from the PQC shared key and a transcript hash and establishing a secure connection with the client using the server key share.

Additional embodiments are directed to a post-quantum integration system for integrating post-quantum cryptographic algorithms into TLS and configured to perform the methods described above. The present summary is not intended to illustrate each aspect of, every implementation of, and/or every embodiment of the present disclosure

BRIEF DESCRIPTION OF THE DRAWINGS

These and other features, aspects, and advantages of the embodiments of the disclosure will become better understood with regard to the following description, appended claims, and accompanying drawings where:

Figure 1:
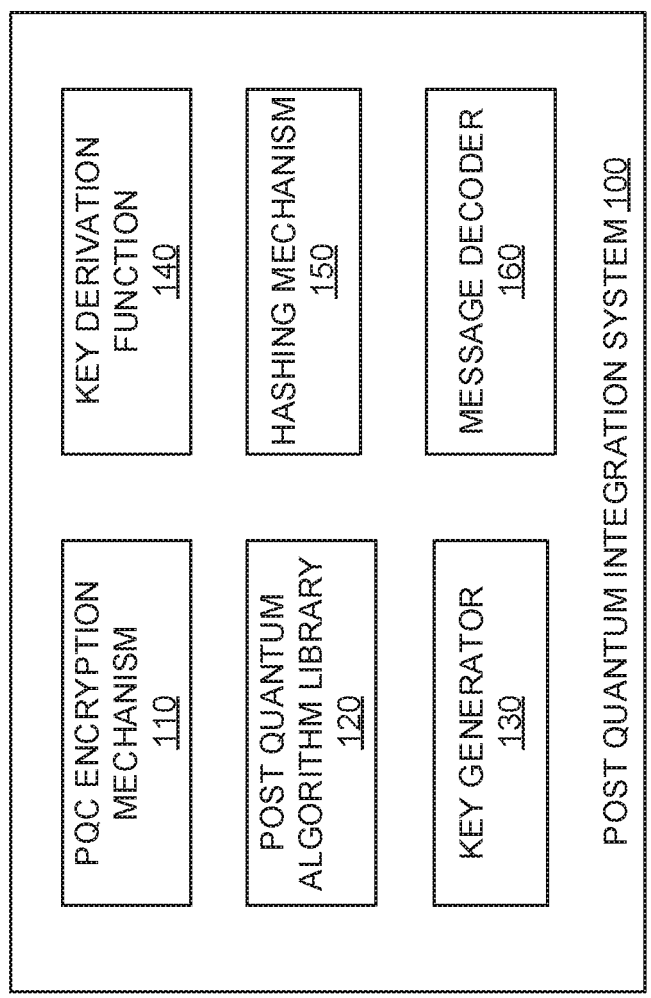
FIG. 1 is a block diagram illustrating a post-quantum integration system, in accordance with embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to post-quantum cryptography, and more specifically, to implementing post-quantum cryptographic algorithms in Transport Layer Security (TLS) protocols. While the present disclosure is not necessarily limited to such applications, various aspects of the disclosure may be appreciated through a discussion of various examples using this context.

Quantum computing is an emerging technology utilizing quantum mechanics to solve specific problems deemed effectively impossible to solve on classical computers. There are concerns that data protected by currently deployed encryption methods may become insecure with advancements in quantum computing. Common algorithms such as RSA, Diffie-Hellman, and elliptic curve cryptography are just some of the deployed asymmetric algorithms having the potential of becoming insecure with the existence of quantum computing.

For instance, the TLS handshake protocol implements RSA, Diffie-Hellman, and elliptic curve cryptography to establish secure connections between clients and servers. However, based on Shor's algorithm, these cryptographic algorithms will become insecure on a sufficiently large quantum computer. Shor's algorithm is a polynomial-time quantum computer algorithm for integer factorization. On a quantum computer, Shor's algorithm can run in polynomial time and solve problems such as factoring, discrete logarithm (DLP), and elliptic curve discrete logarithm (ECDLP). The cryptographic algorithms mentioned above rely on these problems being impossible to solve on a classical computer in order to remain cryptographically secure.

Given the widespread use of TLS, transitioning to post-quantum cryptography is needed as current asymmetric cryptographic algorithms become insecure due to the advent of quantum computing. Various post-quantum algorithms have been created to replace current asymmetric cryptographic algorithms used by TLS that have the potential to remain secure in the era of quantum computing. These post-quantum algorithms include, for example, Kyber PQC, FrodoKEM, SIKE, Picnic, and TESLA.

Post-quantum cryptography implementations with TLS exist that replace the use of RSA, Elliptic Curve Diffie-Hellman (ECDH), and Elliptic Curve Digital Signature Algorithm (ECDSA). These implementations propose a hybrid model where both key exchanges and signatures are performed in parallel, generating both a classical exchange/signature and a post-quantum one.

The hybrid approach of a post-quantum TLS implementation implements a new cipher suite to signal post-quantum cryptography. Additionally, key encapsulation methods are used with a random key alongside an algorithm such as ECDHE. The post-quantum cryptography value exchanged is concatenated or XOR'ed with the ECDHE key.

Limitations on post-quantum security remain, however, as current implementations do not protect encryption methods using post-quantum algorithms from being negated. An attacker may prevent the implementation of post-quantum security. For example, an attacker may intercept a client hello message containing a request for post-quantum cryptography. Since current post-quantum TLS solutions operate in hybrid mode, the client may then request a traditional TLS connection that is susceptible to quantum attacks. Alternatively, attackers can directly break traditional algorithms without breaking quantum-safe algorithms. Current implementations use traditional algorithms and post-quantum algorithms side by side and combine them to perform a single TLS handshake. Thus, an attacker can simply break the traditional algorithms to create a vulnerability in the connection.

By way of example, a client transmits a client hello message to a server. Included in the client hello message are parameters requesting a post-quantum secure connection. A man-in-the-middle attacker can intercept the message and detect the post-quantum parameter. Upon detection, the attacker can prevent the message from being transmitted to the server. On the client-side, the client perceives the delay as a failed attempt to establish a post-quantum connection. As such, the client transmits another client hello message with a traditional secure connection request. The attacker can intercept the message, detect the traditional secure connection parameter, and let the message proceed to the server. Using quantum computing capabilities, the attacker can intercept the ensuing asymmetric encrypted messages and potentially decrypt them.

Embodiments of the present disclosure may overcome the above and other problems by using a post-quantum integration system. The post-quantum integration system provides quantum-safe TLS. First, the post-quantum integration system uses methods to signal a request for post-quantum cryptography (PQC) to be used in establishing a connection between a client and a server. These methods are designed in such a way that they are unlikely to be blocked by perimeter processors, other middleware, or by man-in-the-middle attackers. The random values used in a handshake message can be embedded with a signal that indicates the request. This helps in the detection and avoidance of possible downgrade attacks where an attacker attempts to downgrade from a PQC mode of operation to a traditional mode of operation.

Additionally, the post-quantum integration system uses a hybrid mode of operation where PQC algorithms in-turn protect traditional algorithms. By doing so, the PQC algorithms would need to be broken before traditional algorithms are exposed to a quantum computing attack. Thus, traditional algorithms receive the enhanced security provided by the PQC algorithms. Two sets of client/server hello messages are used to establish the connection. In the first client/server hello messages, PQC keys are exchanged, and a PQC shared key is established. In the second client/server hello messages, keys are derived from the PQC shared key and a handshake transcript hash. The keys are used to exchange traditional ECDHE key shares. The handshake transcript hash used as part of a key schedule provides additional protection against man-in-the-middle attacks.

More specifically, the post-quantum signaling system described herein embeds a signal in a random number signaling a request for a PQC mode of operation. Downgrade attacks are avoided because the request in a client hello message is not apparent. A man in the middle intercepting messages would not be able to detect the request by viewing the contents of the message. Additionally, the random number included in the client hello message cannot be altered without destroying the TLS handshake process.

Essentially, the post-quantum integration system integrates post-quantum algorithms into the TLS protocol. Communication between a client and a server is commonly secured using the TLS protocol. TLS provides cryptographic protocols designed to provide communications security over a computer network. A server and a web client can establish a TLS connection by exchanging information in adherence with the TLS handshake protocol. The TLS handshake protocol defines the format of messages and the order of their exchange. Once exchanged, the result is a successful TLS connection, in which both the server and the web client can exchange application data securely using the TLS protocol. A successful TLS handshake between a web client and a server that establishes a TLS connection is commonly referred to as a TLS session.

Embodiments of the present disclosure include utilizing Generate Random Extensions And Sustain Extensibility (GREASE) extensions to exchange PQC secrets to provide middlebox tolerance. GREASE is a mechanism to prevent extensibility failures in the TLS ecosystem. It reserves a set of TLS protocol values that may be advertised by clients to ensure the server correctly handles unknown values. For example, a client may select one or more random GREASE cipher suite values and advertise them in a client hello cipher suite field. In some embodiments, the client places a PQC client public key in an unused extension value defined by GREASE that is defaulted as ignored.

Embodiments of the present disclosure include embedding a signal message in a random value. For example, a hashing function can iteratively generate a hash value from a random number. After each iteration, the resulting hash value can be inspected to determine if the signal message is included within the hash value. The iterative process continues until a hash value, containing the signal message is embedded within the random number.

For example, a client and a server initiate the process of establishing a TLS connection. A server and a web client can establish a TLS connection by exchanging information in adherence with the TLS handshake protocol. During the TLS handshake, the client includes a 32-byte random value and optional information, such as various protocol parameters. The client can embed a signal message in the 32-byte random value prior to sending it to the server. The random number, with the embedded signal message, can act as a signal requesting support for a PQC mode of operation during the establishment of the TLS connection. The server can decode the embedded message and respond based on the signal or authenticate the sender by verifying that the secret is correct.

In some embodiments, a client abandons the secure connection establishment upon detecting that the server has reverted back to a traditional handshake process. For example, during the TLS handshake process, the client and the server can signal to each other that they are operating under the PQC mode of operation. If a client receives a message that does not contain the signal, they can stop communicating with the server and abandon the connection.

Referring now to FIG. 1, shown is a block diagram illustrating a post-quantum integration system 100, in accordance with embodiments of the present disclosure. The post-quantum integration system 100 includes a PQC encryption mechanism 110, a post-quantum algorithm library 120, a key generator 130, a key derivation function 140, a hashing mechanism 150, and a message decoder 160.

The PQC encryption mechanism 110 is a component of the post-quantum integration system 100 configured to apply one or more quantum-resistant public-key cryptographic standards. The public-key cryptographic standards can specify one or more additional unclassified, publicly disclosed digital signature, public-key encryption, and key-establishment algorithms that are available. These PQC algorithms being capable of protecting information from quantum computing attacks. The PQC encryption mechanism 110 can utilize the PQC algorithms listed within the post-quantum algorithm library 120 when performing encryption procedures.

For example, the PQC encryption mechanism 110 can utilize Cryptographic Suite for Algebraic Lattices (CRYSTALS) Kyber algorithm to perform encryption procedures. Kyber is an IND-CCA2-secure key encapsulation mechanism (KEM), whose security is based on the hardness of solving learning-with-errors (LWE) problem over module lattices.

The post-quantum algorithm library 120 is a library of post-quantum algorithms the post-quantum integration system 100 utilized by the PQC encryption mechanism 110. The post-quantum algorithms include, for example, Big Quake, Bike, CFPKM, Classic McEliece, CRYSTALS-Kyber, DAGS, DualModeMS, EMBLEM, FALCON, HILA5, HQC, Lepton, Lizard, LOTUS, MQDSS, Picnic, Rainbow, Titanium, FrodoKEM, NewHope, and Three Bears. The post-quantum algorithms can additionally be divided into multiple categories. These categories include, for example, lattice-based cryptography, multivariate cryptography, hash-based cryptography, code-based cryptography, super-singular elliptic curve isogeny cryptography, and symmetric key quantum resistance.

The key generator 130 is a component of the post-quantum integration system 100 configured to generate PQC key pairs and traditional key pairs. Key pairs are pairs of public and private keys that can be used with a selected algorithm. It can associate algorithm-specific parameters with each of the generated keys. The key pairs can be generated either as an algorithm-independent initialization or an algorithm-specific initialization. Key pairs consist of a public key and a private key where the public key is used for encryption, and the private key is used for decryption.

The key derivation function 140 is a component of the post-quantum integration system 100 configured to derive one or more secret keys from a secret value and a master key using a pseudorandom function. The key derivation function 140 can be used to stretch keys into longer keys or to obtain keys of a required format, such as converting a group element that is the result of a key exchange into a symmetric key. In conjunction with non-secret parameters to derive one or more keys from a common secret value.

The key derivation function 140 can be used in applications to derive keys from other keys or passwords, which have properties that allow the derived keys to be used directly as cryptographic keys. In some embodiments, the key derivation function 140 extends a key with a transcript hash using a cryptographic hash function. The key derivation function 140 can input a key and the transcript hash and applies a hash function to generate a fixed-length pseudorandom key. Using the pseudorandom key, the key derivation function 140 expands the key into several additional pseudorandom keys. During expansion, the number and the length of the output keys can depend on the specific cryptographic algorithm for which the keys are needed. Another hash function is applied to the pseudorandom key and any other additional information that can be optional and application-specific.

The hashing mechanism 150 is a component of the post-quantum integration system 100 configured to apply hash functions to random values produced by a number generator. The hash functions include, for example, MD5, SHA-1, SHA-256, SHA-3, and BLAKE2. These hash functions can include properties such as preimage resistance and collision resistance. Preimage resistance describes the security guarantee that given a random hash value, an attacker can never find a preimage of that hash value. As such, hash functions can be considered one-way functions because preimage resistance allows for the transition from a message to its hash, but not from the hash back to the message. As such, hash functions cannot be inverted.

Preimage resistance ensures that it is practically impossible to find any message that maps to a given hash value. Specifically, preimage resistance, or first-preimage resistance, describes cases where it is practically impossible to find a message that hashes to a given value. Whereas second-preimage resistance describes cases that, when given a message, it is practically impossible to find another message that hashes to the same value as the first message.

Collision resistance refers to a property that prevents an attacker from being able to find two distinct messages that hash to the same value. Collision resistance can also be considered second-preimage resistance. The hashing mechanism 150 is further configured to eliminate birthday attacks. A birthday attack is defined by N message and as many hash values, where a total of N×(N'1)/2 potential collisions can be produced by considering each pair of two hash values. To prevent a birthday attack that determines a collision, the hashing mechanism 150 can utilize hash-based message authentication code (HMAC) as the hash function. By design, HMACs are less affected by collisions than other widely used hashing functions.

Additionally, the hash value produced by the hashing mechanism 150 retains the randomness of the initial random value. This is because hash functions provide unbiased uniform distributions. As such, given a random value, the randomness of the resulting hash value is not diminished, resulting in an equivalent random value.

The hashing mechanism 150 is further configured to iteratively apply a hash function to a random value until a bit sequence representing a message is produced in a resulting hash value. The bit sequence is probabilistic and, on average, will be two to the power of the number of bits in the message. For example, a twelve-bit message will require 4,096 hash iterations on average. As such, the length of the message is preferably short, or approximately twelve to eighteen bits.

There is a possibility of a false message being detected in a random value. These instances have a probability of $$\frac{1}{2^{\wedge}m}$$

where m represents the number of bits in the message. A tradeoff of generation time based on the size of a message for greater false signal resistance on a per use case basis is also preferred. Otherwise, the generation time may exceed an acceptable time frame for a generation when generating messages that are larger. Additionally, the size of the message also diminishes the effective working size of a hash function being used. For example, if a message is twelve bits in length, then the strength of a SHA256 hash function is reduced to 244 bits. Larger messages would reduce the strength of the hash function to the point of vulnerability.

The message decoder 160 is a component of the post-quantum integration system 100 configured to decode messages embedded in messages. The hashing mechanism 150 can apply a pre-shared hash function on a received random value to generate a hash value. The message decoder can analyze the hash value and verify that the bit sequence is set in the hash value generated by the hashing mechanism 150.

In some embodiments, the message decoder 160 verifies that the bit sequence in the hash value is consistent with a pre-shared secret between the sending party and the receiving party. For example, a sending party may have embedded a password used to authenticate the sending party. The message decoder 160 can verify that the password is consistent with the password stored by the receiving party. Upon verifying the bit sequence, the message decoder 160 can confirm that the message is received. Depending on the type of message transmitted and upon successful verification, the embedded message may be used to grant a sending party access to restricted areas, or it may allow for different protocol features (e.g., post-quantum cryptography).

It is noted that FIG. 1 is intended to depict the major representative components of an exemplary post-quantum integration system 100. In some embodiments, however, individual components may have greater or lesser complexity than as represented in FIG. 1, components other than or in addition to those shown in FIG. 1 may be present, and the number, type, and configuration of such components may vary.

Figure 2:
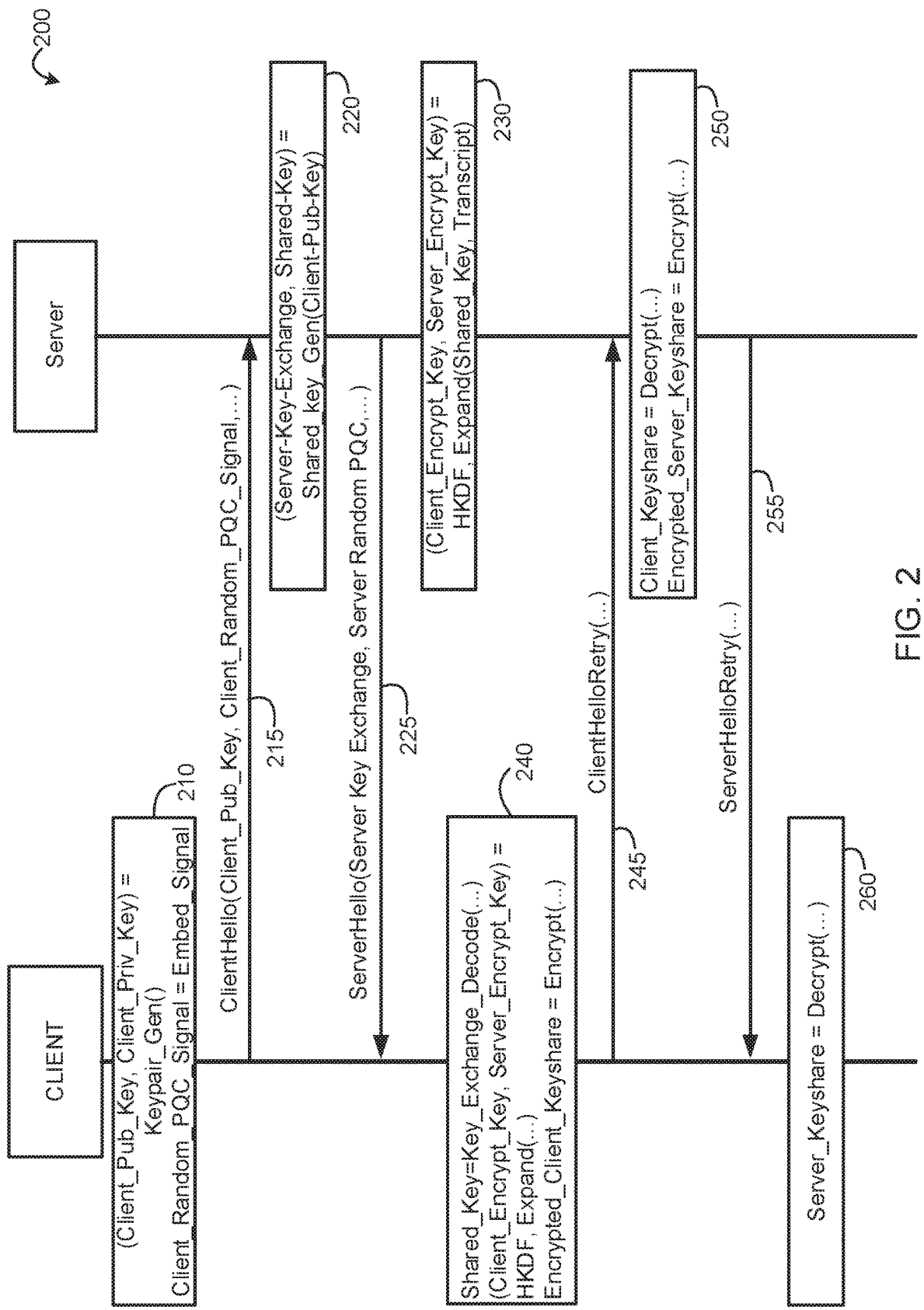
FIG. 2 is a data flow diagram illustrating a post-quantum integration handshake between a client and a server using a post-quantum integration process according to the post-quantum integration system, in accordance with embodiments of the present disclosure.

FIG. 2 is a data flow diagram 200 illustrating a PQC integration in a TLS handshake according to the post-quantum integration system 100 according to embodiments of the present disclosure. Process 200 begins by the key generator 130 generating a PQC key pair for a client. This is illustrated at step 210. The PQC key pair includes a PQC public client key and a PQC private client key. Additionally, hashing mechanism 150 embeds a random value with a signal that indicates the client wishes to initiate a PQC mode of operation with the server.

At step 215, the client transmits a TLS client hello message to the server. The TLS client hello message includes the PQC public client key and the embedded signal random value as parameters. As per the TLS protocol, a client hello message is the first message a client transmits to a server when requesting a secure connection. Based on the TLS protocol, the client hello message includes a random value, a session identifier, a cipher suite list, and compression algorithms supported by the client.

Upon receiving the client hello message, the message decoder 160 evaluates the received random value to determine whether a PQC signal is embedded in the random value. This is illustrated at step 220. Upon determining the random value contains the PQC signal request, the key generator 130, on the server-side, generates a PQC shared key and a PQC server key exchange using the PQC public client key as input. The PQC server key exchange can be used by the client to generate the PQC shared key on the client-side. Additionally, the hashing mechanism 150, on the server-side, embeds a random value with a signal that indicates the server acknowledges the PQC mode of operation with the client.

At step 225, the server transmits a server hello message that includes the PQC server key exchange and the random value with the PQC signal authorizing the PQC mode of operation. As per the TLS protocol, a server hello message includes a server version, a random value, a session identification, a select cipher suite, a compression method, and a list of extensions. Only extensions offered by the client can appear in the server's list. At step 230, on the server-side, the key derivation function 140 expands the PQC shared key and a transcript hash to generate a client encryption key and a server encryption key.

On the client-side, the message decoder 160 analyzes the random value received in the server hello message to determine that the PQC mode of operation request has been authorized. Upon determining authorization, the PQC encryption mechanism 110 produces the PQC shared key by decoding the PQC server key exchange using the PQC private client key. The key derivation function 140, on the client-side, expands the PQC shared key, and the transcript hash to generate the same client encryption key and server encryption key produced on the server-side. Using the client encryption key, the PQC encryption mechanism 110 encrypts a client key share to produce a PQC encrypted client key share. This is illustrated at step 240.

At step 245, the client transmits a second client hello message. The second client hello message includes the PQC encrypted client key share and another embedded signal random value as parameters.

At step 250, the PQC encryption mechanism 110 decrypts the PQC encrypted client key share to reveal the client key share. Additionally, the message decoder 160 evaluates the received random value from the second hello message to determine that the PQC mode of operation is still requested. Using the server encryption key, the PQC encryption mechanism 110 encrypts a server key share to produce a PQC encrypted server key share.

At step 255, the server transmits a second server hello message. The second server hello message includes the PQC encrypted server key share and another embedded signal random value as parameters. At step 260, on the client-side, the PQC encryption mechanism 110 decrypts the PQC encrypted server key share to reveal the server key share. Using the server key share and the client key share, the server and client can complete the establishment of the secure connection.

Figure 3:
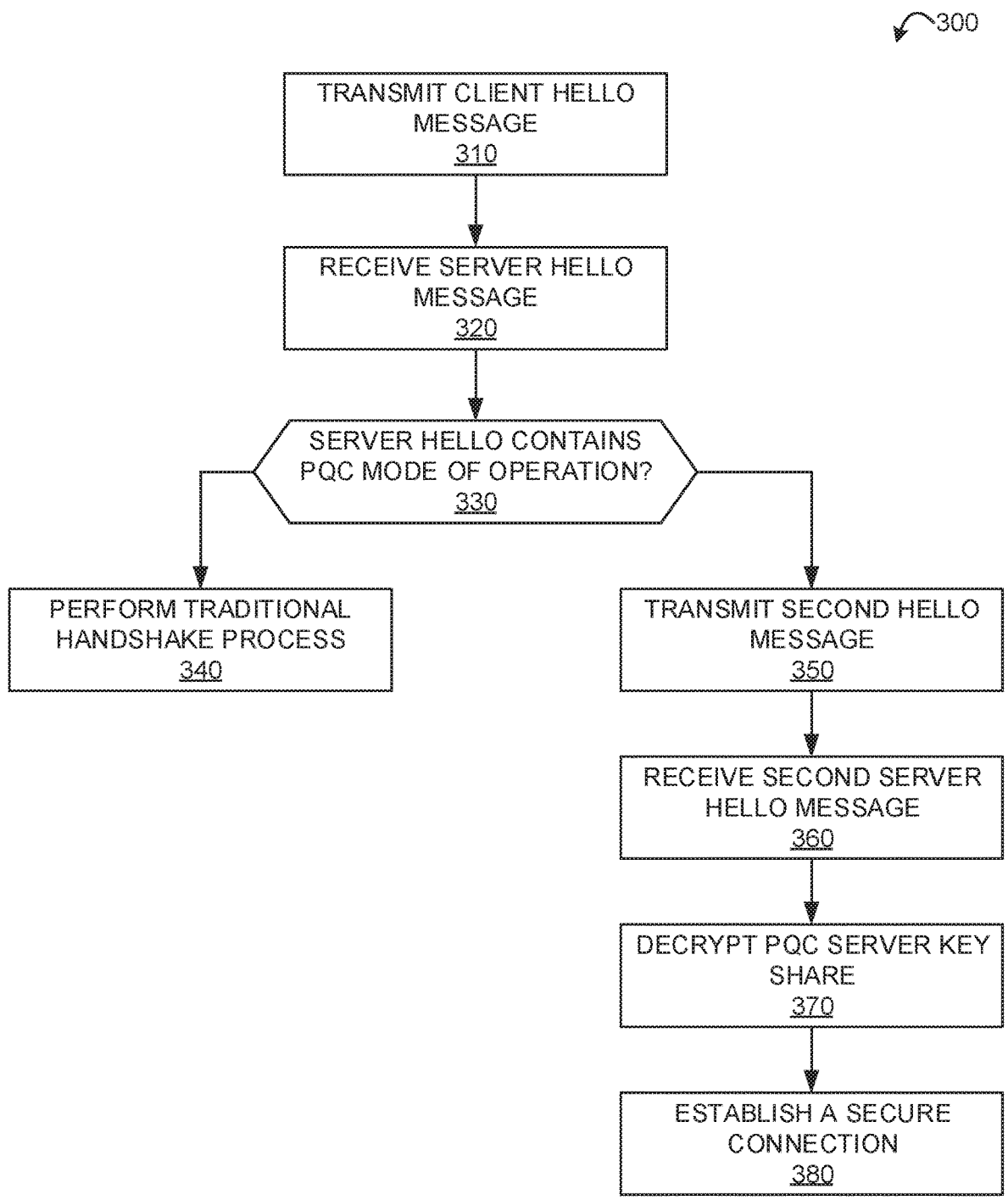
FIG. 3 is a flow diagram of a client-side post-quantum integration handshake process, in accordance with embodiments of the present disclosure.

FIG. 3 is a flow diagram illustrating a process 300 for a client-side post-quantum integration handshake process, in accordance with embodiments of the present disclosure. The process 300 begins by transmitting a client hello message from a client to a server. This is illustrated at step 310. The client hello message can be an initial message requesting a secure connection between the client and the server. The client hello message can adhere to different TLS handshake protocols as defined by the different versions of TLS. For example, the client hello message can adhere to TLS version 1.0, 1.1, 1.2, and 1.3. The TLS handshake protocol is used to negotiate the security parameters of a connection. The Handshake messages (e.g., client/server hello messages) are supplied to the TLS record layer, where they are encapsulated within or more TLS plaintext or TLS ciphertext structures that are processed and transmitted as specified by the secure connection created.

When a client first connects to a server, it is required to send the client hello message as its first TLS message. The client will be required to also send another client hello message if the server responds to the first client hello message with a retry request. Included in the client hello message is a random value with an embedded signal indicating a request for a PQC mode of operation. The PQC mode of operation indicates that the client wishes to establish a secure connection with the server using post-quantum algorithms to prevent possible post-quantum attacks. Additionally, the client hello message includes a PQC public client key. Step 310 is described in greater detail hereinafter with respect to process 500 of FIG. 5.

The client receives a server hello message from the server to the client. This is illustrated at step 320. The server hello message can include a PQC server key exchange generated from the PQC public client key as well as a random value. The message decoder 160 can analyze the random value to determine whether or not it contains an authorization/acknowledgment of the PQC mode of operation. The analysis evaluates the random value to determine whether a corresponding signal is embedded within the random value that is in response to the signal transmitted in the client hello message. This is illustrated at step 330.

Upon determining that the random value does not contain a signal message authorizing the PQC mode of operation, the client can proceed by establishing a secure connection using traditional standard handshake protocols. This is illustrated at step 340. However, if message decoder 160 detects the embedded signal message, the client can proceed by transmitting a second client hello message. This is illustrated at step 350.

The second client hello message can include a PQC encrypted client key share and another random value with an embedded signal indicating a request to maintain a PQC mode of operation. The PQC mode of operation indicates that the client wishes to continue with establishing a secure connection with the server using post-quantum algorithms. Step 350 of transmitting the second client hello message is described in greater detail hereinafter with respect to process 700 of FIG. 7.

The client receives a second server hello message in response to the second client hello message. This is illustrated at step 360. The second server hello message can include a PQC encrypted server key share and another random value with an embedded signal indicating an acknowledgement/authorization to maintain the PQC mode of operation during the handshake process. The PQC encryption mechanism 110 decrypts the PQC encrypted server key share using a server encryption key derived from a PQC shared key and a transcript hash. This is illustrated at step 370. The result of the decryption is a server key share. The client establishes a secure connection with the server using the client/server key share. This is illustrated at step 380.

Figure 4:
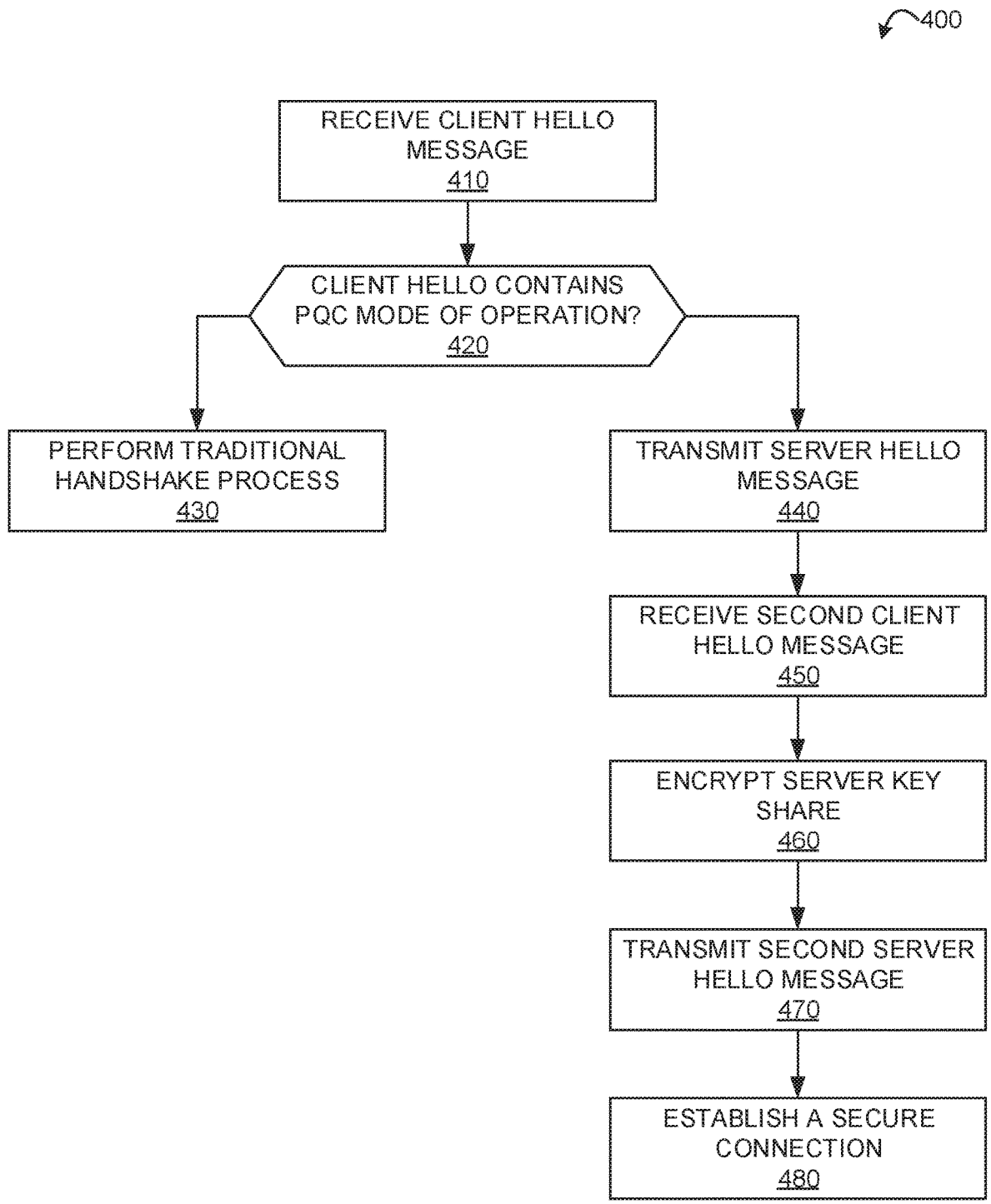
FIG. 4 is a flow diagram of a server-side post-quantum integration handshake process, in accordance with embodiments of the present disclosure.

FIG. 4 is a flow diagram illustrating a process 400 of a server-side post-quantum integration handshake process, in accordance with embodiments of the present disclosure. The process 400 begins by receiving a client hello message from a client to a server. This is illustrated at step 410. The client hello message can be an initial message requesting a secure connection between the client and the server. Included in the client hello message is a random value with a possible embedded signal indicating a request for a PQC mode of operation. The PQC mode of operation indicates that the client wishes to establish a secure connection with the server using post-quantum algorithms to prevent possible post-quantum attacks. Additionally, the client hello message includes a PQC public client key.

The message decoder 160, on the server-side, can analyze the received random value to determine whether or not it contains a request for a PQC mode of operation. This is illustrated at step 420. The analysis evaluates the random value to determine whether a corresponding signal is embedded within the random value requesting the PQC mode of operation. For example, if the random value contains the signal 'PQC' within the random value. It should be noted, however, that other signals can be used as predetermined by the client and server.

Upon determining that the random value does not contain a signal message requesting the PQC mode of operation, the server can proceed by establishing a secure connection using traditional standard handshake protocols. This is illustrated at step 430. However, if message decoder 160 detects the embedded signal message, the server can proceed by transmitting a server hello message. This is illustrated at step 440.

The server hello message can include a PQC server key exchange and a random value with an embedded signal authorizing/acknowledging the PQC mode of operation. The embedded signal indicates that the server has the capabilities to proceed with the PQC mode of operation to establish a secure connection with the client and is wishing to do so. Step 440 of transmitting the server hello message is described in greater detail hereinafter with respect to process 600 of FIG. 6.

The server receives a second client hello message in response to the server hello message. This is illustrated at step 450. The second client hello message can include a PQC encrypted client key share and another random value with an embedded signal indicating a request to maintain a PQC mode of operation. The PQC mode of operation indicates that the client wishes to continue with establishing a secure connection with the server using post-quantum algorithms.

The PQC encryption mechanism 110 encrypts a server key share. This is illustrated at step 460. A server encryption key is derived from a PQC shared key and a transcript hash. The PQC shared key being generated by the key generator 130. Using the server encryption key, the PQC encrypted client key share received in the second client hello message is decrypted by the PQC encryption mechanism 110. The server key share is generated by the key generator 130 and encrypted by the PQC encryption mechanism 110 using the server encryption key.

The server proceeds by transmitting a second server hello message to the client. This is illustrated at step 470. The second server hello message includes the PQC encrypted server key share and another random value with an embedded signal authorizing/acknowledging the continued PQC mode of operation. Step 470 of transmitting the second server hello message is described in greater detail hereinafter with respect to process 800 of FIG. 8. The server establishes a secure connection with the client using the client/server key share. This is illustrated at step 480.

Figure 5:
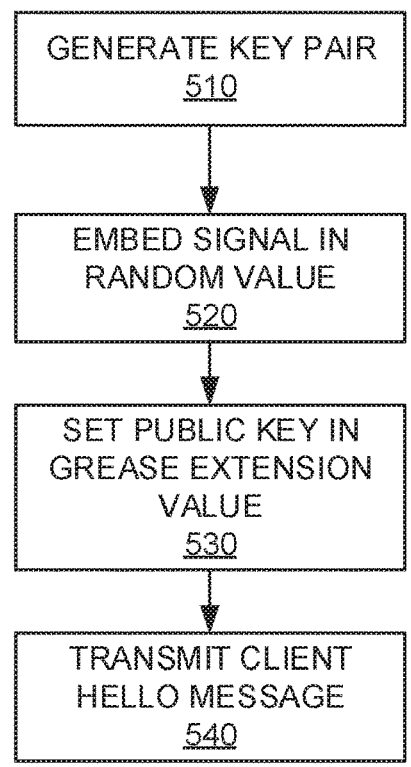
FIG. 5 is a flow diagram of transmitting a client hello message process, in accordance with embodiments of the present disclosure.

FIG. 5 is a flow diagram illustrating a process 500 of transmitting a client hello message, in accordance with embodiments of the present disclosure. The process 500 begins by the key generator 130 generating a PQC key pair for a client. This is illustrated at step 510. The PQC key pair includes a PQC public client key and a PQC private client key. The PQC key pair can be based on the post-quantum key techniques selected by the client.

The hashing mechanism 150 applies a hash function to a random value produced by a PRNG to produce an embedded signal. This is illustrated at step 520. The hashing mechanism 150 iteratively applies the hash function while evaluating the resulting hash value. The hashing mechanism 150 continues applying the hash function to the resulting hash value until a hash value is produced with a sequence of bits corresponding to a signal message representing a request for the PQC mode of operation. Step 520 of embedding a signal message in a random value is described in greater detail hereinafter with respect to process 900 of FIG. 9.

The PQC public client key is set in a GREASE extension value. This is illustrated at step 530. In some embodiments, the client hello message uses GREASE extensions in the client hello message. The PQC public client key can be placed in a GREASE extension to assist in the avoidance of middleware or man-in-the-middle attacks. The TLS protocol includes several points of extensibility, including a list of cipher suites and the list of extensions. The values in these lists identify implementation capabilities. TLS follows a model where one side, usually the client, advertises capabilities, and the server selects them. The responding side must ignore unknown values so that new capabilities may be introduced to the ecosystem while maintaining interoperability. However, errors may cause an implementation to reject unknown values. To avoid these errors, GREASE reserves some currently unused values for TLS implementations to advertise at random. The client hello message can use one of the unused values to transmit the PQC public client key.

The client transmits the client hello message to a server. This is illustrated at step 540. The client hello message can be an initial message requesting a secure connection between the client and the server. The client hello message can include the PQC public client key set in a GREASE extension and the random value with an embedded signal requesting a PQC mode of operation.

Figure 6:
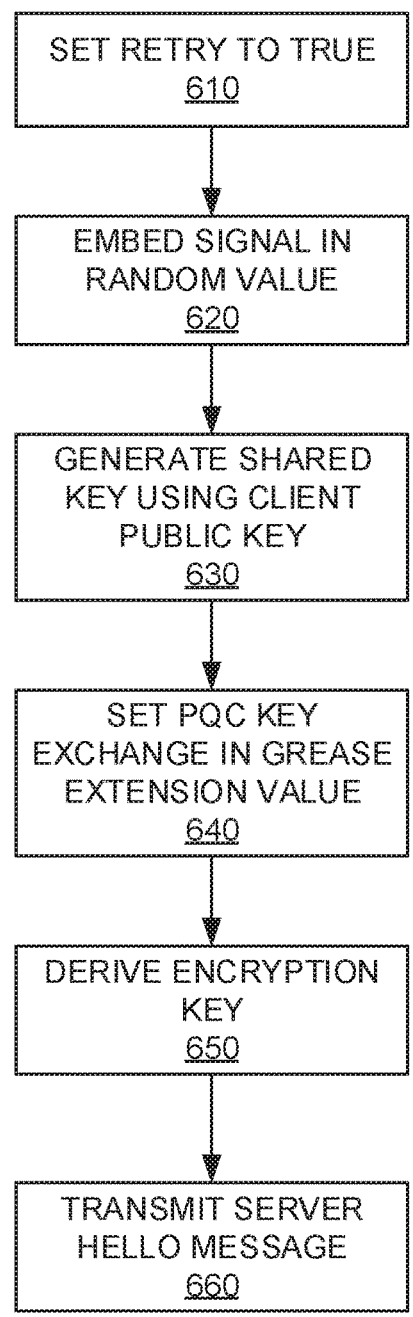
FIG. 6 is a flow diagram of transmitting a server hello message process, in accordance with embodiments of the present disclosure.

FIG. 6 is a flow diagram illustrating a process 600 of transmitting a server hello message process, in accordance with embodiments of the present disclosure. The process 600 begins by a server setting a retry request to true. This is illustrated at step 610. Typically, a server sends a retry request in response to a client hello message if it is able to find an acceptable set of parameters, but the client hello does not contain sufficient information to proceed with the handshake. A retry request maintains the same format as a server hello message, where the legacy version, legacy session id echo, cipher suite, and legacy compression method fields have the same meaning. The retry request is sent to allow the client to transmit PQC information back to the server.

For retry requests, the server's extensions must contain supported versions. Additionally, it should contain the minimal set of extensions necessary for the client to generate a corresponding second client hello message. The retry request cannot contain any extensions that were not offered by the client in their client hello message.

The hashing mechanism 150 applies a hash function to a random value produced by a PRNG to produce an embedded signal. This is illustrated at step 620. The hashing mechanism 150 iteratively applies the hash function while evaluating the resulting hash value. The hashing mechanism 150 continues applying the hash function to the resulting hash value until a hash value is produced with a sequence of bits corresponding to a signal message representing an authorization/acknowledgment of the PQC mode of operation. Step 620 of embedding a signal message in a random value is described in greater detail hereinafter with respect to process 900 of FIG. 9.

The PQC encryption mechanism 110 generates a PQC shared key and a PQC key exchange using the PQC public client key received in the client hello message. This is illustrated at step 630. Key exchange is a method by which cryptographic keys are exchanged between two parties, allowing the use of a cryptographic algorithm. The PQC key exchange can be decoded using the PQC private client key to generate the PQC shared key on the client-side.

The PQC key exchange is set in a GREASE extension value. This is illustrated at step 640. In some embodiments, the server hello message uses GREASE extensions in the server hello message. The PQC key exchange can be placed in a GREASE extension to assist in the avoidance of middleware or man-in-the-middle attacks. The server hello message can use one of the unused GREASE values to transmit the PQC key exchange.

The key derivation function 140 derives a client encryption key and a server encryption key using the PQC shared key and a transcript hash to expand the shared key. This is illustrated at step 650. A key derivation function takes a source of keying material, with a randomness component (e.g., the transcript hash), and derives from it one or more cryptographically strong keys. In this instance, the key derivation function 140 produces the client encryption key and the server encryption key.

The transcript hash is computed by hashing the concatenation of each individual handshake message, including the handshake message header carrying the handshake message type and length fields. In some embodiments, when the server responds with a retry request, the value of the client hello message is replaced with a special synthetic handshake message containing the hash of the client hello message. The reason for this construction allows the server to make a stateless retry request by storing just the hash of the client hello message.

The server transmits the server hello message to a client. This is illustrated at step 660. The server hello message being the response to the client hello message requesting a secure connection between the client and the server. The server hello message includes the PQC key exchange set in a GREASE extension and the random value with an embedded signal authorizing the PQC mode of operation.

Figure 7:
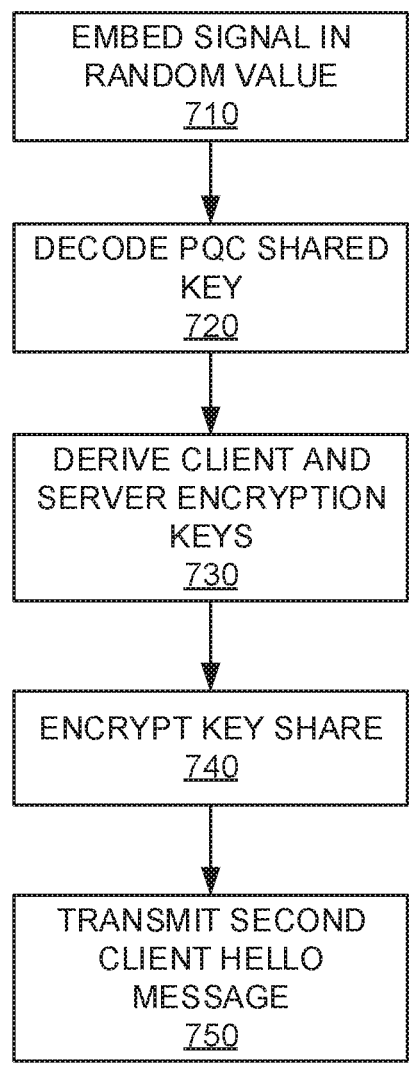
FIG. 7 is a flow diagram of transmitting a second client hello message, in accordance with embodiments of the present disclosure

FIG. 7 is a flow diagram illustrating a process 700 of transmitting a second client hello message process, in accordance with embodiments of the present disclosure. The process 700 begins with the hashing mechanism 150, on the client-side, embedding a signal in another random value. This is illustrated at step 710. Similar to step 520 in process 500 of FIG. 5, the hashing mechanism 150 iteratively applies the hash function while evaluating the resulting hash value. The hashing mechanism 150 continues applying the hash function to the resulting hash value until a hash value is produced with a sequence of bits corresponding to a signal message representing a request for the PQC mode of operation. Step 710 of embedding a signal message in a random value is described in greater detail hereinafter with respect to process 900 of FIG. 9.

The PQC encryption mechanism 110 decodes the PQC shared key. This is illustrated in step 720. A PQC key exchange was included in a server hello message. Using a PQC private client key generated during the first client hello message, the PQC encryption mechanism 110 decodes the PQC key exchange for producing the PQC shared key.

The key derivation function 140 derives a client encryption key and a server encryption key using the PQC shared key and a transcript hash to expand the shared key. This is illustrated at step 730. A key derivation function takes a source of keying material, with a randomness component (e.g., the transcript hash), and derives from it one or more cryptographically strong keys. In this instance, the key derivation function 140 produces the client encryption key and the server encryption key. The client encryption key and the server encryption key being the same keys derived on the server-side as represented in step 650 of process 600.

The PQC encryption mechanism 110 encrypts a client key share using a PQC algorithm available in the post-quantum algorithm library 120 and the client encryption key. This is illustrated at step 740. In some embodiments, the PQC algorithm used to encrypt the client key share is the kyber algorithm.

The client transmits the second client hello message to the server. This is illustrated at step 750. The second client hello message can be in response to a retry request message received from the server. The second client hello message can include the PQC encrypted client key share and the random value with an embedded signal requesting a continued PQC mode of operation.

Figure 8:
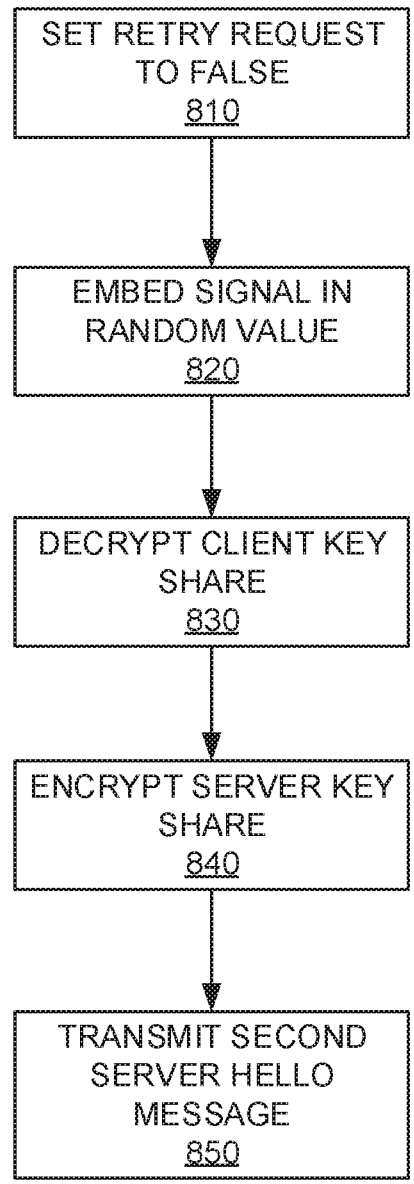
FIG. 8 is a flow diagram of transmitting a second server hello message, in accordance with embodiments of the present disclosure.

FIG. 8 is a flow diagram illustrating a process 800 of transmitting a second server hello message process, in accordance with embodiments of the present disclosure. The process 600 begins by a server setting a retry request to false. This is illustrated at step 810. By setting the retry request to false, this conveys to the client that another client hello message is not necessary or required. The hashing mechanism 150, on the server-side, embeds a signal in another random value. This is illustrated at step 820. Similar to step 620 in process 600 of FIG. 6, the hashing mechanism 150 iteratively applies the hash function while evaluating the resulting hash value. The hashing mechanism 150 continues applying the hash function to the resulting hash value until a hash value is produced with a sequence of bits corresponding to a signal message representing an authorization/acknowledgment for the PQC mode of operation. Step 810 of embedding a signal message in a random value is described in greater detail hereinafter with respect to process 900 of FIG. 9.

The PQC encryption mechanism 110 decrypts a PQC encrypted client key share. This is illustrated at step 830. The PQC encrypted client key share was previously included in a second client hello message that was received from a client. Using the client encryption key derived from the PQC shared key and transcript hash, the PQC encryption mechanism 110 can decrypt the PQC encrypted client key share to produce the client key share.

The PQC encryption mechanism 110 encrypts a server key share using a PQC algorithm available in the post-quantum algorithm library 120 and the client encryption key. This is illustrated at step 840. In some embodiments, the PQC algorithm used to encrypt the server key share is the kyber algorithm.

The server transmits the second server hello message to the client. This is illustrated at step 850. The second server hello message can be in response to a retry request message received from the server. The second server hello message can include the PQC encrypted server key share and the random value with an embedded signal authorizing a continued PQC mode of operation.

Figure 9:
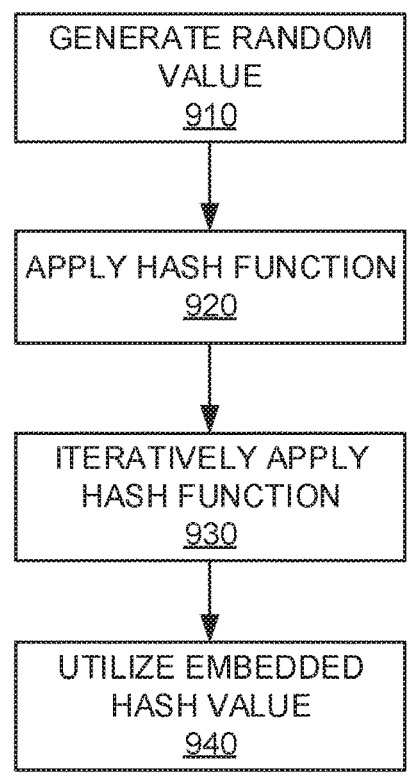
FIG. 9 is a flow diagram of a message embedding process, in accordance with embodiments of the present disclosure.

FIG. 9 is a flow diagram illustrating a process 900 for embedding a message in a random value, in accordance with embodiments of the present disclosure. The process 900 begins with a number generator generating a random value. This is illustrated at step 910. In some embodiments, the number generator utilizes a CSPRNG to generate the random value. The CSPRNG can be a secure block cipher converted into a CSPRNG by running the cipher in a counter mode. The counter mode is performed by using the block cipher to encrypt a '1', and then a '2', and so on until a random value is produced using the result of the encryptions. In counter mode, the block cipher can be started at an arbitrary number other than one or zero. By utilizing a block cipher, the birthday paradox is avoided because a block cipher in counter mode does not output identical blocks. The type of block ciphers used by the number generator includes, for example, Feistel ciphers, substitution-permutation networks, Lai-Massey ciphers, and ARX.

In some embodiments, the number generator uses a stream cipher to generate a random value. A stream cipher works by generating a pseudorandom stream of bits that are combined and XORed with plaintext. The stream cipher can operate on a counter that returns a new pseudorandom stream. The type of stream ciphers used by the number generator includes, for example, RC4, A5/1, ISAAC, Salsa20, VEST, and A5/2.

Once the random value is generated, a hashing mechanism applies a hash function to the random value. This is illustrated at step 920. The generated hash value is examined to determine whether a bit sequence representing a message a sending party wishes to embed located within the hash value. The generated hash value can also be placed into a hash table to allow the post-quantum integration system 100 to reference the hash value if needed. For example, if the sending party and the receiving party have a pre-shared number, the hash value that is transmitted may be any of the generated hash values depending on when the bit sequence is generated.

The hashing mechanism 150 iteratively applies the hash function as illustrated at step 920 until the bit sequences representing the message appear in a generated hash value. This is illustrated at step 930. The iterative process is the repetition of the hashing mechanism 150 applying a hash function to the previously generated hash value in order to generate a hash value that has a bit sequence representing a message a sending party wishes to embed. Each repetition of the process is a single iteration, and the outcome of each iteration is then the starting point of the next iteration (i.e., the generated hash value is used as input in the subsequent iteration).

In some embodiments, the hash value generated at each iteration is placed into the hash table. After each iteration, a hash value is generated and can be placed into the hash table. The hash values can be placed into the hash table until a hash value with a bit sequence corresponding to a message is generated. For example, if the message is 'PQC', the hash value with 'PQC' embedded in its bit sequence will cause the iterative process to complete.

In some embodiments, an iteration count is incremented after each iteration. After each iteration, the iteration count is incremented until the hash value with a bit sequence corresponding to a message is generated. The increment count can reflect the number of iterations that occurred to reach the final hash value with the embedded message.

An embedded signal hash value is utilized as a new random value in a cryptosystem. This is illustrated at step 940. In some embodiments, a previous hash value is utilized as a new random value in a cryptosystem. The previous hash value can be the hash value that immediately preceded the final hash value that had the embedded message. In some embodiments, the hash value utilized is from an iteration that preceded the final hash value containing the embedded signal by a pre-shared and predetermined number. For example, a pre-shared number often can be known to a sending party and receiving party. The hash value that is used would be from an iteration that occurred ten iterations before the final iteration. The hash table can be referenced, and the hash value can be retrieved.

In some embodiments, the pre-shared and predetermined number is incremented after each use. The increments can be incremented by one or by some other agreed-upon number such as five or twelve. For example, if the predetermined number is five after the sending party transmits a hash value that occurred five iterations prior to the final hash value, five is incremented by the agreed-upon number. If the agreed-upon number is one, then the predetermined number is incremented to six, and so on.

In some embodiments, the hash value utilized is the random value generated by the number generator. The hash value generated by a predetermined iteration can be examined to determine whether a bit sequence is produced in the hash value. Upon determining that the hash value does not have the bit sequence, then the random value can be utilized as the random value in the cryptosystem. This prevents inadvertent messages from appearing in random values when the sending party wishes to not send a message.

Figure 10:
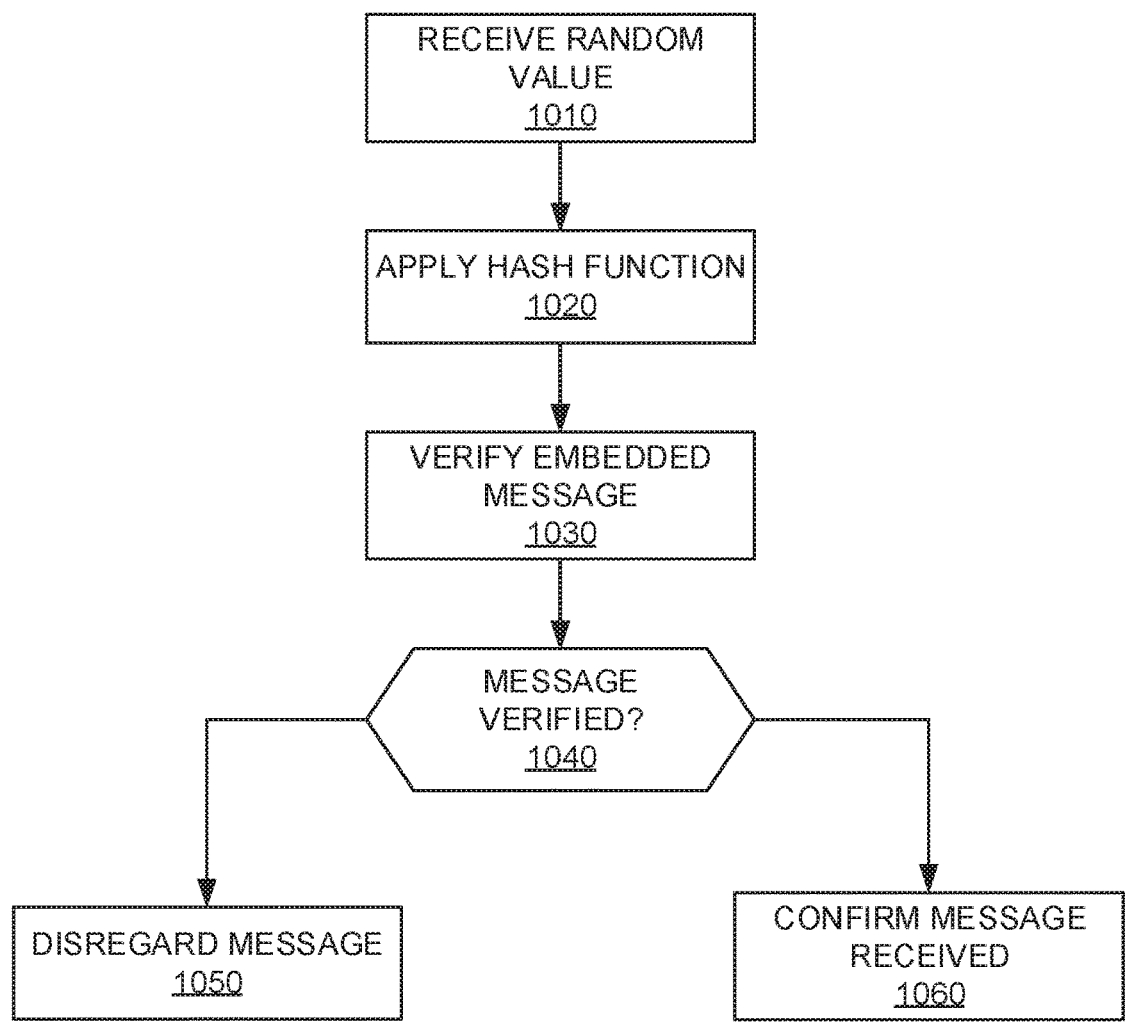
FIG. 10 is a flow diagram of a message decoding process, in accordance with embodiments of the present disclosure.

FIG. 10 is a flow diagram illustrating a process 1000 for decoding a message in a random value, in accordance with embodiments of the present disclosure. The process 1000 begins with the post-quantum integration system 100 receiving a random value. This is illustrated at step 1010. The random value can be a parameter in the transmission of a cryptosystem. For example, the random value can be a parameter in a transmission sent by a client establishing a TLS connection or secure socket layer (SSL) connection with a server. If the random value was included in a TLS client hello message, the random value is 32-bytes in length. However, the size of the random value can vary depending on the cryptosystem being utilized.

A hashing mechanism 150 applies a hash function to the random value. This is illustrated at step 1020. The same hash function used to embed a message in the random value is the same hash function being used. The type of hash function used by a sending party can be included as a parameter when sending the random value. The hashing mechanism 150 iteratively applies the hash function a predetermined amount of times. The amount of times the hashing mechanism 150 applies the hash function can be based on a predetermined number shared between the sending party and the receiving party. For example, if the predetermined number is one, then the hashing mechanism 150 applies the hash function to the random value once. In another instance, if the predetermined number is ten, then the hashing mechanism 150 iteratively applies the hash function to the random value and resulting hash values ten times. The final hash value contains the embedded message.

A message decoder 160 verifies that the final hash value contains the embedded message. This is illustrated at step 1030. The message decoder can verify the relationship between the sending party and the receiving party to determine the type of message being received. For example, the sending party and the receiving party may have an agreement on a pre-shared secret to be used as the message. The sending party can transmit the secret, which can be used as an authentication factor by the receiving party to authenticate the sending party.

In some embodiments, the message decoder 160 verifies the message as a feature signal. To avoid man-in-the-middle interference (e.g., Internet Service Providers (ISP)s) from preventing protocol features, a sending party can transmit a signal message to a receiving party for a feature in a protocol that may be prohibited by an intervening party. For example, a protocol feature may be post-quantum cryptography, which the sending party wishes to enable. Upon receiving the embedded signal message, the receiving party can provide that feature to the sending party.

The message decoder 160 determines whether the message is verified. This is illustrated at step 1040. For example, if the message is used as a type of authentication mechanism, then the message decoder 160 can verify whether the message corresponds with a pre-shared secret. If the message does not match exactly to the pre-shared secret, then the message is disregarded. This is illustrated at step 1050. The sending party can then utilize the random value in the cryptosystem as if no embedded message was transmitted. However, if the message is verified, the sending party proceeds with confirming that the message is received. This is illustrated at step 1060. The confirmation can depend on the type of message being sent. If the message corresponds to a protocol feature request, the sending party can implement that feature and proceed with the steps of the cryptosystem as if the request was made in a parameter. If the message corresponds to a pre-shared secret, then the server can authenticate the user and grant the user the benefits provided by the authentication.

Figure 11:
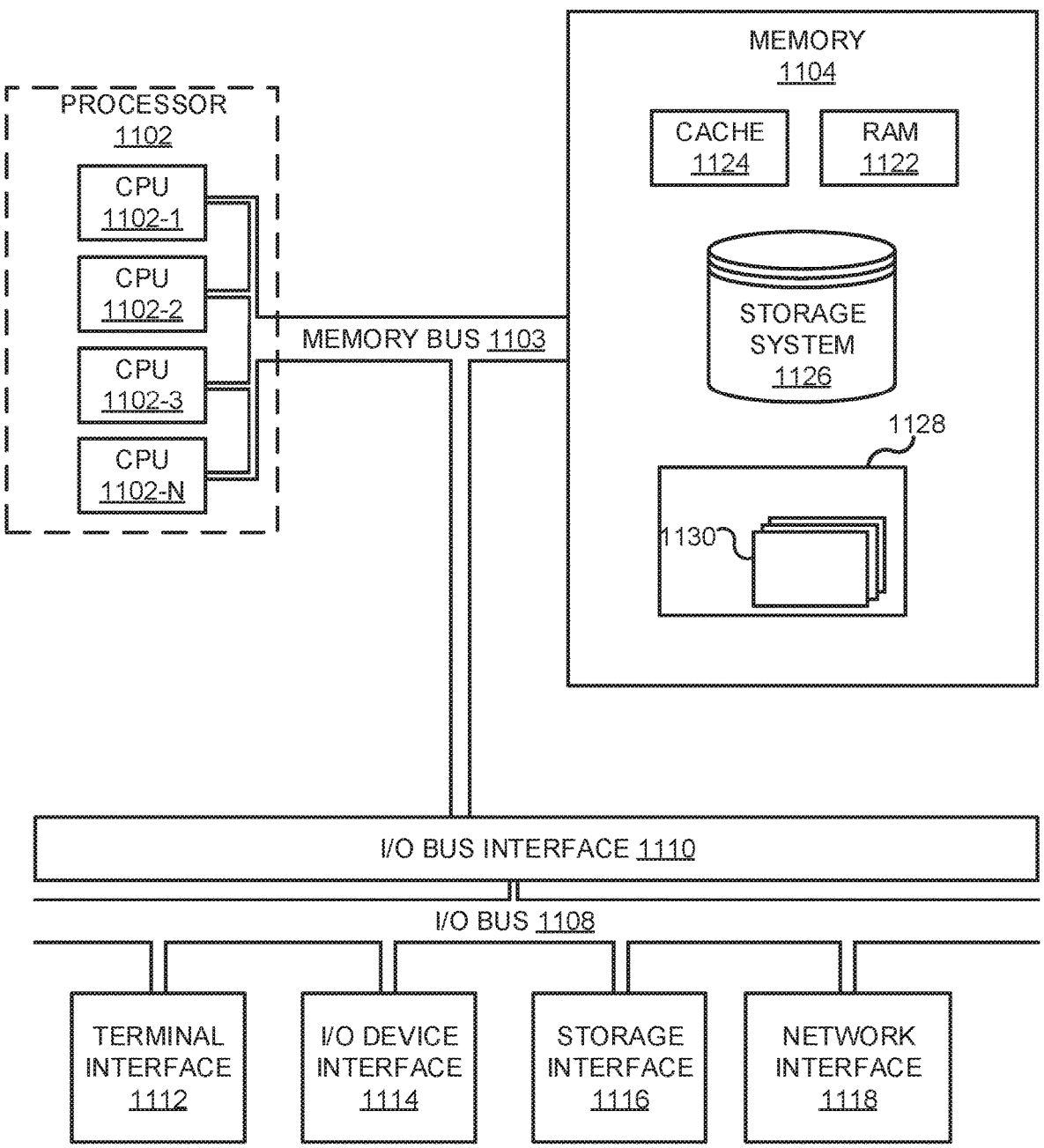
FIG. 11 is a high-level block diagram illustrating an example computer system that may be used in implementing one or more of the methods, tools, and modules, and any related functions, described herein, in accordance with embodiments of the present disclosure.

Referring now to FIG. 11, shown is a high-level block diagram of an example computer system 1100 (e.g., the post-quantum integration system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1100 may comprise one or more processors 1102, a memory 1104, a terminal interface 1112, a I/O (Input/Output) device interface 1114, a storage interface 1116, and a network interface 1118, all of which may be communicatively coupled, directly or indirectly, for inter-component communication via a memory bus 1103, a I/O bus 1108, and an I/O bus interface 1110.

The computer system 1100 may contain one or more general-purpose programmable central processing units (CPUs) 1102-1, 1102-2, 1102-3, and 1102-N, herein generically referred to as the processor 1102. In some embodiments, the computer system 1100 may contain multiple processors typical of a relatively large system; however, in other embodiments, the computer system 1100 may alternatively be a single CPU system. Each processor 1101 may execute instructions stored in the memory 1104 and may include one or more levels of on-board cache.

The memory 1104 may include computer system readable media in the form of volatile memory, such as random-access memory (RAM) 1122 or cache memory 1124. Computer system 1100 may further include other removable/non-removable, volatile/non-volatile computer system storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

Although the memory bus 1103 is shown in FIG. 11 as a single bus structure providing a direct communication path among the processors 1102, the memory 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single respective units, the computer system 1100 may, in some embodiments, contain multiple I/O bus interface units, multiple I/O buses, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1100 may be a multi-user mainframe computer system, a single-user system, or a server computer or similar device that has little or no direct user interface but receives requests from other computer systems (clients). Further, in some embodiments, the computer system 1100 may be implemented as a desktop computer, portable computer, laptop or notebook computer, tablet computer, pocket computer, telephone, smartphone, network switches or routers, or any other appropriate type of electronic device.

It is noted that FIG. 11 is intended to depict the major representative components of an exemplary computer system 1100. In some embodiments, however, individual components may have greater or lesser complexity than as represented in FIG. 11, components other than or in addition to those shown in FIG. 11 may be present, and the number, type, and configuration of such components may vary.

One or more programs/utilities 1128, each having at least one set of program modules 1130 (e.g., the post quantum integration system 100) may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 12:
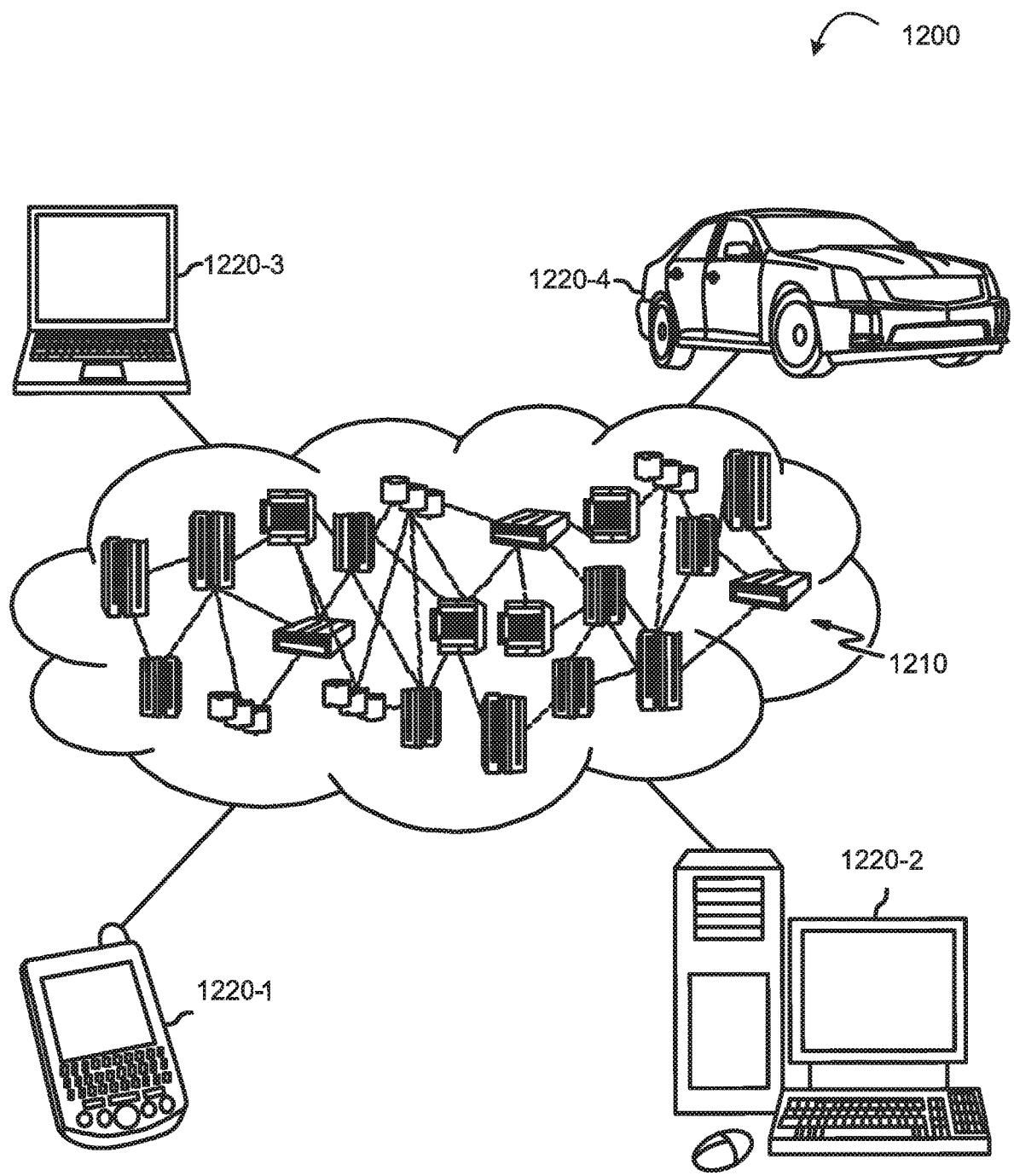
FIG. 12 depicts a cloud computing environment, in accordance with embodiments of the present disclosure.

Referring now to FIG. 12, illustrative cloud computing environment 1200 is depicted. As shown, cloud computing environment 1200 includes one or more cloud computing nodes 1210 with which local computing devices used by cloud consumers, such as, for example, personal digital assistant (PDA) or cellular telephone 1220-1, desktop computer 1220-2, laptop computer 1220-3, and/or automobile computer system 1220-4 may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1200 to offer infrastructure, platforms and/or software as services for which a cloud consumer does not need to maintain resources on a local computing device. It is understood that the types of computing devices 1220-1 to 1220-4 shown in FIG. 12 are intended to be illustrative only and that computing nodes 1210 and cloud computing environment 1200 can communicate with any type of computerized device over any type of network and/or network addressable connection (e.g., using a web browser).

Figure 13:
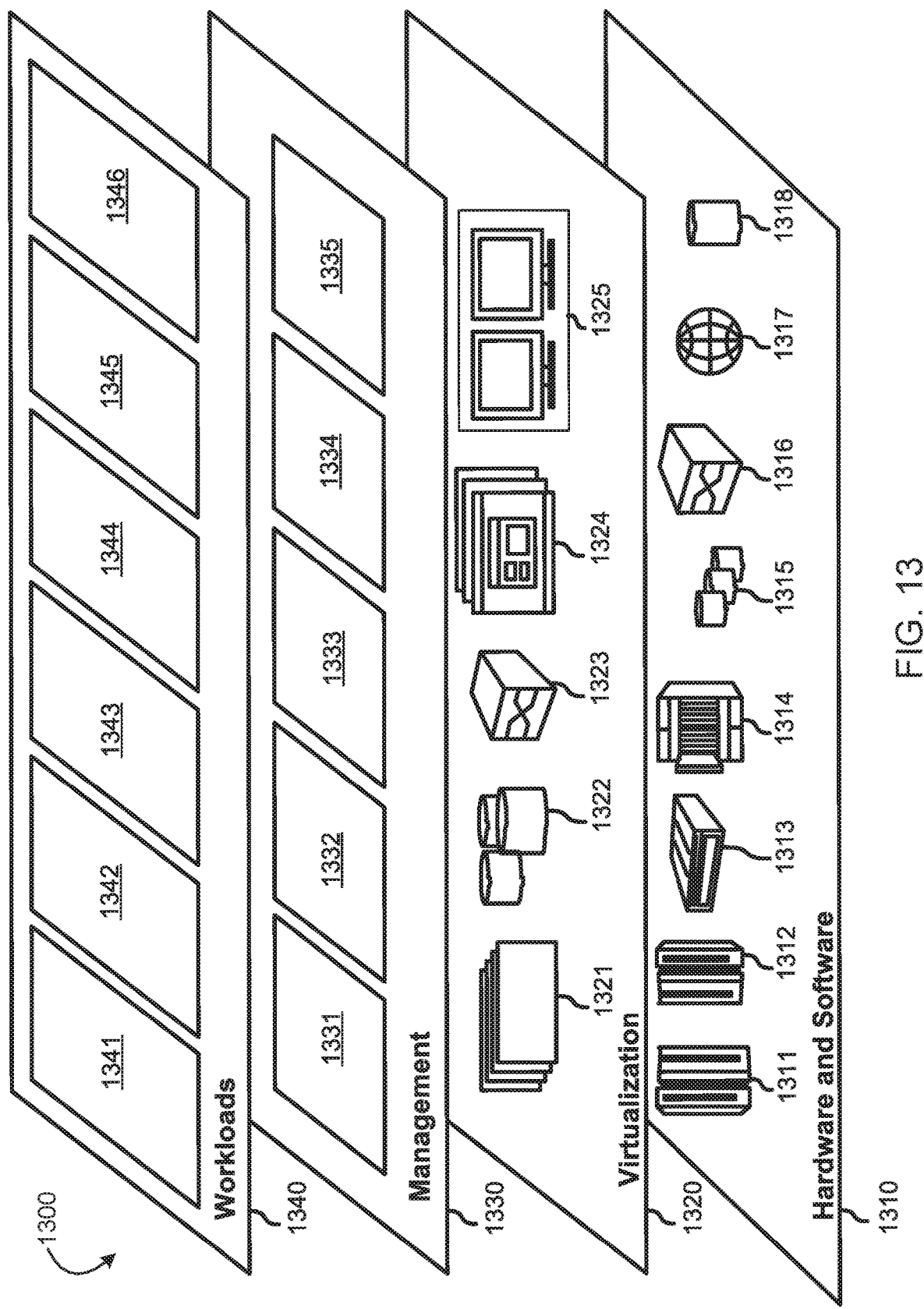
FIG. 13 depicts abstraction model layers, in accordance with embodiments of the present disclosure.

Referring now to FIG. 13, a set of functional abstraction layers 1300 provided by cloud computing environment 1200 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1310 includes hardware and software components. Examples of hardware components include mainframes 1311; RISC (Reduced Instruction Set Computer) architecture-based servers 1312; servers 1313; blade servers 1314; storage devices 1315; and networks and networking components 1316. In some embodiments, software components include network application server software 1317 and database software 1318.

Virtualization layer 1320 provides an abstraction layer from which the following examples of virtual entities may be provided: virtual servers 1321; virtual storage 1322; virtual networks 1323, including virtual private networks; virtual applications and operating systems 1324; and virtual clients 1325.

In one example, management layer 1330 may provide the functions described below. Resource provisioning 1331 provides dynamic procurement of computing resources and other resources that are utilized to perform tasks within the cloud computing environment. Metering and Pricing 1332 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1333 provides access to the cloud computing environment for consumers and system administrators. Service level management 1334 provides cloud computing resource allocation and management such that required service levels are met. Service Level Agreement (SLA) planning and fulfillment 1335 provide pre-arrangement for, and procurement of, cloud computing resources for which a future requirement is anticipated in accordance with an SLA.

Workloads layer 1340 provides examples of functionality for which the cloud computing environment may be utilized. Examples of workloads and functions which may be provided from this layer include mapping and navigation 1341; software development and lifecycle management 1342 (e.g., the post quantum integration system 100); virtual classroom education delivery 1343; data analytics processing 1344; transaction processing 1345; and precision cohort analytics 1346.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method for integrating post quantum cryptographic (PQC) algorithms into transport layer security (TLS), the computer-implemented method comprising:
    transmitting a client hello message to a server requesting a PQC mode of operation to establish a secure connection between a client and the server, wherein the client hello message includes a PQC public client key;
    receiving a server hello message from the server, wherein the server hello message includes a PQC server key exchange generated from the PQC public client key;
    determining the server hello message includes an authorization to operate the PQC mode of operation;
    transmitting a second client hello message to the server, wherein the second client hello message includes a PQC encrypted client key share encrypted using a client encryption key derived from a handshake transcript hash and a PQC shared key;
    receiving a second server hello message, wherein the second server hello message includes a PQC encrypted server key share;
    decrypting the PQC encrypted server key share using a server encryption key to reveal a server key share; and
    establishing a secure connection between the client and the server using the server key share.

2. The computer-implemented method of claim 1, wherein transmitting the client hello message comprises:
    generating a PQC key pair, wherein the PQC key pair includes the PQC public client key and a PQC private client key;
    embedding a signal message in a random value, the signal message indicating a request for the PQC mode of operation; and
    transmitting the client hello message to the server, wherein the client hello message includes the random value and the PQC public client key as parameters.

3. The computer-implemented method of claim 1, wherein transmitting the second client hello message comprises:
- embedding a second signal message in a second random value, the second signal message indicating a continued request for the PQC mode of operation;
- generating the PQC shared key using a PQC private client key and the PQC server key exchange received in the server hello message;
- deriving a client encryption key and a server encryption key from the PQC shared key and the transcript hash, the transcript hash being a value determined by hashing a concatenation of each handshake message;
- encrypting a client key share using the client encryption key; and
- transmitting the second client hello message, wherein the second client hello message includes the second random value and the encrypted client key share.

4. The computer-implemented method of claim 1, wherein the PQC public client key is set in generate random extensions and sustain extensibility (GREASE) extension within the client hello message.

5. The computer-implemented method of claim 1, wherein the client hello message uses PQC extensions as parameters.

6. The computer-implemented method of claim 1, further comprising:
- detecting the server is performing a traditional handshake process; and
- abandoning the secure connection establishment.

7. The computer-implemented method of claim 1, wherein the client key share is encrypted using a kyber algorithm.

8. A computer-implemented method for integrating post quantum cryptographic (PQC) algorithms in Transport Layer Security (TLS), the computer-implemented method comprising:
- receiving a client hello message from a client requesting an establishment of a secure connection with a server, the client hello message including a PQC public client key and a random value;
- determining the client hello message contains a PQC mode of operation request embedded in the random value;
- transmitting a server hello message to the client, wherein the server hello message includes a retry request, a server random value with an embedded signal authorizing the PQC mode of operation, and a PQC server key exchange as parameters;
- receiving a second client hello message from the client, the second client hello message including a PQC encrypted client key share encrypted using a client encryption key derived from a handshake transcript hash relating to the client and a PQC shared key;
- deriving an encryption key pair from a PQC shared key and a transcript hash, the encryption key pair includes a server encryption key and a client encryption key;
- encrypting a server key share using the server encryption key to produce a PQC encrypted server key share;
- transmitting a second server hello message, wherein the second server hello message includes another random value with another embedded signal authorizing the PQC mode of operation and the PQC encrypted server key share; and
- establishing a secure connection with the client using the server key share.

9. The computer-implemented method of claim 8, wherein transmitting the server hello message comprises:
- setting a retry request to true, wherein the retry request indicates a request to resend another client hello message from the client;
- embedding a signal message in a random value, the signal message indicating an authorization for the PQC mode of operation;
- generating a post quantum key pair using a PQC public client key obtained in the client hello message, wherein the PQC key pair includes a PQC public server key and a PQC private server key; and
- transmitting the server hello message to the client, wherein the server hello message includes the random value and the PQC public server key as parameters.

10. The computer-implemented method of claim 8, wherein transmitting the second server hello message comprises:
- setting the retry request to false, wherein the retry request indicates a request to resend another client hello message from the client;
- embedding a signal message in a second random value, the signal message indicating an authorization for the PQC mode of operation;
- decrypting the PQC encrypted client key share using the client encryption key producing a client key share;
- encrypting the server key share using the server encryption key to produce the PQC encrypted server key share; and
- transmitting the second server hello message to the client, wherein the second server hello message includes the second random value and the PQC encrypted server key share.

11. The computer-implemented method of claim 8, wherein the PQC server key exchange is set in generate random extensions and sustain extensibility (GREASE) extension within the server hello message.

12. The computer-implemented method of claim 8, wherein the server hello message uses PQC extensions as parameters.

13. The computer-implemented method of claim 8, further comprising:
- detecting the client is performing a traditional handshake process; and
- abandoning the secure connection establishment.

14. The computer-implemented method of claim 8, wherein the PQC encrypted server key share is encrypted using a kyber algorithm.

15. A system comprising:
- one or more processors; and
- one or more computer-readable storage media storing program instructions which, when executed by the one or more processors, are configured to cause the one or more processors to perform a method comprising:
  - transmitting a client hello message to a server requesting a post quantum cryptographic (PQC) mode of operation to establish a secure connection between a client and the server, wherein the client hello message includes a PQC public client key;
  - receiving a server hello message from the server, wherein the server hello message includes a PQC server key exchange generated from the PQC public client key;
  - determining the server hello message includes an authorization to operate the PQC mode of operation;
  - transmitting a second client hello message to the server, wherein the second client hello message includes a PQC encrypted client key share encrypted using a client encryption key derived from a handshake transcript hash and a PQC shared key;

receiving a second server hello message, wherein the second server hello message includes a PQC encrypted server key share;

decrypting the PQC encrypted server key share using a server encryption key to reveal a server key share; and establishing a secure connection between the client and the server using the server key share.

16. The system of claim 15, further comprising:

generating a PQC key pair, wherein the PQC key pair includes a PQC public client key and a PQC private client key;

embedding a signal message in a random value, the signal message indicating a request for the PQC mode of operation; and transmitting the client hello message to the server, wherein the client hello message includes the random number and the PQC public client key as parameters.

17. The system of claim 15, further comprising:

embedding a second signal message in a second random value, the second signal message indicating a continued request for the PQC mode of operation;

generating the PQC shared key using a PQC private client key and a PQC server key exchange received in the server hello message;

deriving a client encryption key and a server encryption key from the PQC shared key and the transcript hash, the transcript hash being a value determined by hashing a concatenation of each handshake message;

encrypting a client key share using the client encryption key; and transmitting the second client hello message, wherein the second client hello message includes the second random value and the encrypted client key share.

18. The system of claim 15, wherein the PQC public client key is set in generate random extensions and sustain extensibility (GREASE) extension within the client hello message.

19. The system of claim 15, wherein the client hello message uses PQC extensions as parameters.

20. The system of claim 15, further comprising:

detecting the server is performing a traditional handshake process; and abandoning the secure connection establishment.

\* \* \* \* \*